US008650081B2

(12) United States Patent
Basel et al.

(10) Patent No.: US 8,650,081 B2
(45) Date of Patent: Feb. 11, 2014

(54) OPTIMIZATION TECHNOLOGY

(75) Inventors: Binyamin Basel, Hod Hasharon (IL); Yizhak Idan, Herzelia (IL)

(73) Assignee: SAP AG, Walldorf (DE)

( * ) Notice: Subject to any disclaimer, the term of this patent is extended or adjusted under 35 U.S.C. 154(b) by 749 days.

(21) Appl. No.: 12/347,649

(22) Filed: Dec. 31, 2008

(65) Prior Publication Data

US 2010/0169067 A1 Jul. 1, 2010

(51) Int. Cl.
*G06F 13/10* (2006.01)
*G06Q 30/02* (2012.01)

(52) U.S. Cl.
CPC ............ *G06F 13/10* (2013.01); *G06Q 30/0255* (2013.01); *G06Q 30/02* (2013.01)
USPC ......................................... 705/14.53; 703/21

(58) Field of Classification Search
CPC ..... G06F 13/10; G06Q 30/0255; G06Q 30/02
USPC ........................................................ 705/14.53
See application file for complete search history.

(56) References Cited

U.S. PATENT DOCUMENTS

| | | | |
|---|---|---|---|
| 6,763,342 B1 * | 7/2004 | Mattern et al. .................. | 706/46 |
| 6,947,922 B1 * | 9/2005 | Glance .......................... | 705/26.1 |
| 7,467,106 B1 * | 12/2008 | Levine et al. ..................... | 705/35 |
| 7,596,583 B2 * | 9/2009 | Chang et al. ........................... | 1/1 |
| 7,908,161 B2 * | 3/2011 | Benayon et al. ............. | 705/7.11 |
| 2002/0161664 A1 * | 10/2002 | Shaya et al. ..................... | 705/26 |
| 2003/0040850 A1 * | 2/2003 | Najmi et al. ........................ | 701/1 |
| 2006/0015859 A1 | 1/2006 | Sattler et al. | |
| 2006/0230234 A1 | 10/2006 | Bentolila et al. | |
| 2007/0179822 A1 * | 8/2007 | Benayon et al. .................. | 705/7 |
| 2009/0307670 A1 * | 12/2009 | Kashyap et al. .............. | 717/135 |
| 2010/0042976 A1 * | 2/2010 | Hines ............................. | 717/127 |
| 2010/0070871 A1 * | 3/2010 | Liesche et al. ................ | 715/744 |
| 2013/0097664 A1 * | 4/2013 | Herz et al. .......................... | 726/1 |

OTHER PUBLICATIONS

"Cache" Microsoft® Computer Dictionary, Fifth Edition, by: Microsoft Press, Publisher: Microsoft Press, Pub. Date: May 1, 2002. And IEEE 100 The Authoritative Dictionary of IEEE Standards Terms Seventh Edition, 2000.*
Jakob Voss, "Tagging, Folksonomy & Co—Renaissance of Manual Indexing?*" Common Library Network, GBV, Gottingen, Germany, Jan. 2007.*
Erika Morphy, "Pluris Launches Multichannel Product Recommendation Engine," CRM Buyer, Dec. 12, 2007.*

(Continued)

*Primary Examiner* — Kirsten Apple
*Assistant Examiner* — Joan Goodbody
(74) *Attorney, Agent, or Firm* — Fish & Richardson P.C.

(57) ABSTRACT

Predictive modeling, in which a first simulation model that simulates a first policy for managing a set of data is determined based on a pattern representative of the set of data and first operating variables for the first policy. The first simulation model is optimized and first prediction data that estimates performance of the first policy is computed using the optimized first simulation model. A second simulation model that simulates a second policy for managing the set of data is determined based on the pattern and second operating variables for the second policy. The second simulation model is optimized and second prediction data that estimates performance of the second policy is computed using the optimized second simulation model. The first prediction data is compared with the second prediction data, and a determination of whether the first policy is better than the second policy is made.

19 Claims, 8 Drawing Sheets

(56) References Cited

OTHER PUBLICATIONS

Ian Witten and Eibe Frank, Data Mining: Practical Machine Learning Tools and Techniques (Table of Contents), 3rd Edition, Morgan Kaufmann, ISBN 0120884070, 2005.

'Power, Decision support systems: concepts and resources for managers' [online]. Quorum books, 2002, [retrieved on Dec. 11, 2012]. Retrieved from the Internet <URL: http://diuf.unifr.ch/ds/courses/dss2002/pdf/Dss.pdf>, 5 pages.

Trevor Hastie, Robert Tibshirani, Jerome Friedman, The Elements of Statistical Learning: Data Mining, Inference, and Prediction (Table of Contents), Springer Verlag, 2001.

Marakas, G. M. (1999). Decision support systems in the twenty-first century (Table of Contents), Upper Saddle River, N.J., Prentice Hall.

* cited by examiner

OPTIMIZATION TECHNOLOGY

TECHNICAL FIELD

This description generally relates to optimization technology and a cache mechanism.

BACKGROUND

Computer systems often are used to manage and process data. Application programs also may be used for analyzing data, including analyzing data obtained through transaction processing systems. In many cases, the data needed for analysis may have been produced by various transaction processing systems and may be located in many different data management systems. Analytical processing may be used to analyze data and identify relationships in data stored in a data warehouse or another type of data repository.

SUMMARY

In one aspect, a system includes an optimization and recommendation engine configured to identify an interaction with a user that presents an opportunity to provide a recommendation to the user and an electronic data store configured to store recommendation data associated with available recommendations. The system also includes a qualification system configured to access, from the electronic data store, recommendation data associated with available recommendations and perform qualification analysis on the accessed recommendation data to identify recommendations for which the user corresponding to the identified interaction is qualified. The system further includes a cache configured to cache user data associated with the user corresponding to the identified interaction and cache the identified recommendations for which the user is qualified. The optimization and recommendation engine is further configured to determine initial interaction information related to the identified interaction with the user, select, from among the identified recommendations loaded into the cache, a first recommendation based on the user data loaded into the cache and the determined initial interaction information, and provide the first recommendation for presentation to the user. In addition, the optimization and recommendation engine is configured to monitor interactions relevant to the identified interaction with the user and, based on the monitoring, detect a change in interaction information related to the identified interaction with the user. In response to detecting the change in interaction information, the optimization and recommendation engine is configured to select, from among, the identified recommendations loaded into the cache, a second recommendation based on the user data loaded into the cache and the change in interaction information. The second recommendation is different than the first recommendation. The optimization and recommendation engine is configured to provide the second recommendation for presentation to the user.

In another aspect, a computer-implemented method of optimizing recommendations includes using one or more processors to perform operations. The operations include identifying an interaction with a user that presents an opportunity to provide a recommendation to the user and loading, into a cache, user data associated with the user corresponding to the identified interaction. The operations also include accessing, from an electronic data store, recommendation data associated with available recommendations and performing qualification analysis on the accessed recommendation data to identify recommendations for which the user corresponding to the identified interaction is qualified. The operations further include loading, into the cache, the identified recommendations for which the user is qualified and determining initial interaction information related to the identified interaction with the user. In addition, the operations include selecting, from among the identified recommendations loaded into the cache, a first recommendation based on the user data loaded into the cache and the determined initial interaction information and providing the first recommendation for presentation to the user. Further, the operations include monitoring interactions relevant to the identified interaction with the user and, based on the monitoring, detecting a change in interaction information related to the identified interaction with the user. In response to detecting the change in interaction information, the operations include selecting, from among the identified recommendations loaded into the cache, a second recommendation based on the user data loaded into the cache and the change in interaction information. The second recommendation is different than the first recommendation. The operations include providing the second recommendation for presentation to the user.

Implementations may include one or more of the following features. For example, the method may include accessing, from the electronic data store, user data associated with the user corresponding to the identified interaction, indexing the accessed user data, and loading, into the cache, the indexed user data. The method also may include loading, into the cache, user data associated with the user corresponding to the identified interaction prior to identifying the interaction with the user.

In some examples, the method may include identifying, based on the user data loaded into the cache, recommendations for which the user meets eligibility criteria. The method may include identifying an agent handling the interaction with the user, accessing, from the electronic data store, skills information associated with the identified agent, and identifying, based on the accessed skills information, recommendations that correspond to the skills of the identified agent handling the interaction with the user. The method further may include determining, based on the user data loaded into the cache, a target profile corresponding to the user and identifying recommendations that correspond to the target profile corresponding to the user.

The method may include identifying, based on the user data loaded into the cache, recommendations previously offered to the user and removing recommendations that have been previously offered to the user. The method also may include filtering the accessed recommendation data through a series of qualification gates including (1) a first qualification gate that filters recommendations for which the user does not meet eligibility criteria, (2) a second qualification gate that filters recommendations for which an agent handling the interaction with the user does not possess skills necessary to effectively present the recommendations, (3) a third qualification gate that filters recommendations that do not correspond to a target profile associated with the user, and (4) a fourth qualification gate that filters recommendations that have been previously offered to the user. The method further may include selecting the first recommendation based on a monetary value corresponding to the first recommendation.

In some implementations, the method may include determining, for each of the identified recommendations loaded into the cache, a user suitability score based on the user data loaded into the cache and the determined initial interaction information and determining, for each of the identified recommendations loaded into the cache, a value score that reflects a relative monetary value of the corresponding recommendation. In these implementations, the method may include determining, for each of the identified recommendations loaded into the cache, a combined score based on the determined user suitability scores and the determined value scores, the combined scores reflecting a combination of expected response to the recommendations and business value of the recommendations and selecting the first recommendation based on the determined combined scores that reflect a combination of expected response to the recommendations and business value of the recommendations. Further, in these implementations, the method may include determining that at least two recommendations have the combined score that reflects the highest combination of expected response and business value of the identified recommendations loaded into the cache, comparing the user suitability scores associated with the at least two recommendations, and selecting, from among the at least two recommendations, the recommendation having the user suitability score that reflects the highest expectation of response.

The method may include sending, over a network, the first recommendation to an application system and receiving, over the network and from the application system, feedback related to the user's reaction to the first recommendation. The method also may include detecting that the user moves to a different section of a website while browsing the website and selecting, from among the identified recommendations loaded into the cache, a second recommendation that is related to the different section of the website. The method further may include detecting that the user has made a complaint about price of a good or service during the interaction and excluding recommendations associated with a good or service that has a relatively high price.

In some examples, the method may include monitoring aspects of service being provided in an environment in which the identified interaction with the user is occurring, detecting a change in the service being provided in an environment in which the identified interaction with the user is occurring, and selecting a second recommendation based on the detected change in the service being provided in an environment in which the identified interaction with the user is occurring. The method may include determining a communication channel associated with the interaction with the user and determining a reason that the user initiated the interaction and selecting a first recommendation that is suitable for the communication channel associated with the interaction with the user and that accounts for the reason that the user initiated the interaction.

In some implementations, the method may include, in response to determining the initial interaction information related to the identified interaction with the user, loading, into the cache, the initial interaction information and, in response to providing the first recommendation for presentation to the user, updating, in the cache, the interaction information to indicate that the first recommendation has been presented to the user. In these implementations, the method may include, in response to detecting the change in interaction information, updating, in the cache, the interaction information to reflect the detected change in interaction information and, in response to providing the second recommendation for presentation to the user, updating, in the cache, the interaction information to indicate that the second recommendation has been presented to the user.

The method also may include identifying an agent handling the interaction with the user and loading, into the cache, agent data associated with the agent handling the interaction with the user. The method further may include selecting, from among the identified recommendations loaded into the cache, a first recommendation based on the agent data loaded into the cache.

In another aspect, at least one computer-readable storage medium is encoded with executable instructions that, when executed by a processor, cause the processor to perform operations. The operations include identifying an interaction with a user that presents an opportunity to provide a recommendation to the user and loading, into a cache, user data associated with the user corresponding to the identified interaction. The operations also include accessing, from an electronic data store, recommendation data associated with available recommendations and performing qualification analysis on the accessed recommendation data to identify recommendations for which the user corresponding to the identified interaction is qualified. The operations further include loading, into the cache, the identified recommendations for which the user is qualified and determining initial interaction information related to the identified interaction with the user. In addition, the operations include selecting, from among the identified recommendations loaded into the cache, a first recommendation based on the user data loaded into the cache and the determined initial interaction information and providing the first recommendation for presentation to the user. Further, the operations include monitoring interactions relevant to the identified interaction with the user and, based on the monitoring, detecting a change in interaction information related to the identified interaction with the user. In response to detecting the change in interaction information, the operations include selecting, from among the identified recommendations loaded into the cache, a second recommendation based on the user data loaded into the cache and the change in interaction information. The second recommendation is different than the first recommendation. The operations include providing the second recommendation for presentation to the user.

Implementations of any of the techniques described throughout the disclosure may include a method or process, a system, or instructions stored on a computer-readable storage device. The details of particular implementations are set forth in the accompanying drawings and description below. Other features will be apparent from the following description, including the drawings, and the claims.

DETAILED DESCRIPTION

Techniques are described for providing real-time optimal recommendations. A real-time optimal recommendation process may account for up-to-the minute data including session data related to an interaction with a user and context in which a recommendation is being provided. The real-time optimal recommendation process also may consider a wide range of information including the most recently updated customer information, marketing input, previous reactions to recommendations, and other events. The real-time optimal recommendation process may first filter all recommendations using qualification gates and then provide recommendations through an optimization process that considers past responses and value associated with the recommendations. The real-time optimal recommendation process may be adaptive and maximize a combination of expected response and business value in providing recommendations.

The logic that drives some recommendation systems is based on offline calculations and analytics (e.g., customers that bought product X also bought product Y). The logic is based on business rules and/or offline predictive modeling of historic data. These types of recommendation systems are not optimal because they do not consider real-time information that is relevant for offering success (e.g., the response of the specific customer in the past, the context of the current interaction, etc.). Although offline analytics may indicate that many customers buy product Y with product X, a specific customer that is currently buying product X may have refused product Y in a prior instance or may be buying product X with a refund coupon that he received because he purchased a faulty product X in the past and this may not be the best time to offer the specific customer additional products. The real-time optimal recommendation process may account for this type of real-time information in providing recommendations (in addition to offline calculations and analytics) and, therefore, may provide enhanced recommendation over systems that rely solely on offline calculations and analytics.

The real-time optimal recommendation process may be applicable to recommendation scenarios where session information is relevant and personalization is important. Example domains may include customer relationship management systems, service management systems, risk management systems, risk scoring systems, collections management systems, and e-commerce systems.

Figure 1:
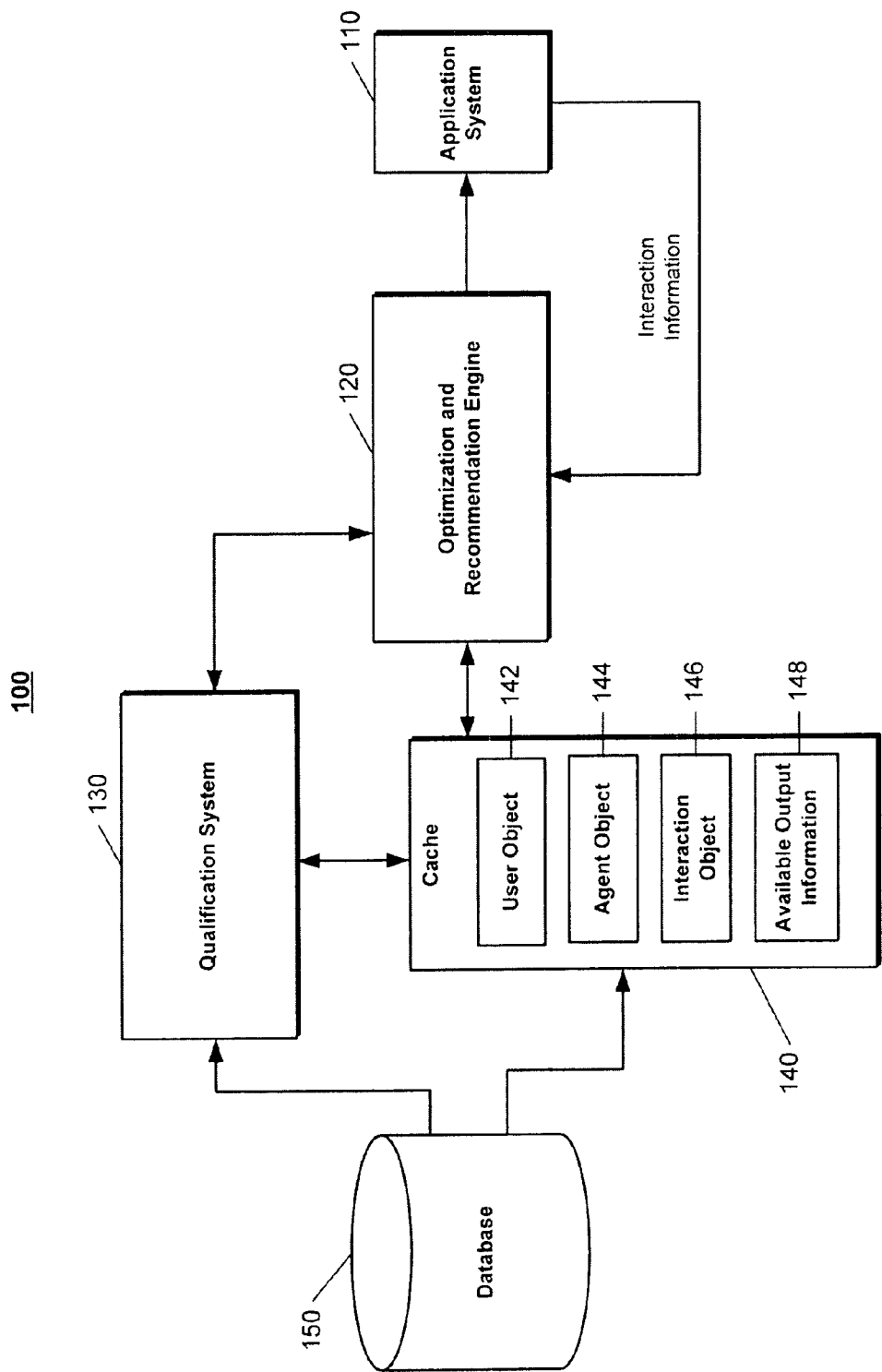
FIGS. 1, 2, and 8 are diagrams of exemplary systems.

Referring to FIG. 1, a system 100 includes an application system 110, an optimization and recommendation engine 120, a qualification system 130, a cache 140, and a database 150. The system 100 may be configured to provide real-time optimal recommendations. In particular, the application system 110 may be a system that handles and/or assists an agent in handling customer interactions (e.g., in a call center, service center or branch office, a computer system supporting an agent in live interactions with a customer, etc.). The application system 110 also may present recommendations to a customer directly (e.g., presenting an offer to the customer over a web site) or indirectly through an agent (e.g., recommend an offer to a call center operator who then presents the offer to the customer). The application system 110 may interact with many customers at a single time.

When the application system 110 begins interaction with a particular customer, the application system 110 sends interaction information to the optimization and recommendation engine 120. The interaction information may identify the customer participating in the interaction, the agent participating in the interaction, the communication channel being used in the interaction, information related to the subject matter of the interaction (e.g., the reason for the customer or agent initiating the interaction), or any other type of information related to the interaction that may be helpful in selecting a recommendation to present in the interaction. In response to receiving the interaction information, the optimization and recommendation engine 120 initiates a process to gather information needed to select an optimal recommendation for presentation in the interaction with the customer.

For example, the optimization and recommendation engine 120 sends at least a portion of the relevant information related to the interaction (e.g., customer identity, communication channel, agent identity, etc.) to a qualification system 130. The qualification system 130 accesses, from the database 150, recommendation data that defines the recommendations available for presentation by the optimization and recommendation engine 120. The qualification system 130 performs a filtering process to identify recommendations that are qualified for presentation in the interaction with the customer.

For instance, the filtering process may exclude recommendations for which the customer is not eligible (e.g., offers for automobiles may be excluded when the customer is a minor, offers that require purchase of a particular product to obtain the offer are excluded if the user has not purchased the particular product, etc.). The filtering process also may exclude recommendations that have been previously offered to the customer and may exclude recommendations that require a target profile that the customer does not match (e.g., offers that require a male between the ages of 25 and 30 are excluded when the customer is a female and/or of an age that is not between 25 and 30). The filtering process further may exclude recommendations that are not suitable for the communication channel in which the interaction is occurring (e.g., web-based recommendations are excluded when the customer is speaking with an operator of a call center) and may exclude recommendations that require an agent to possess certain skills, which the agent handling the interaction lacks (e.g., an offer for a new piece of medical equipment may be excluded when the agent has not been trained on the new piece of medical equipment or has no training in medical equipment at all).

The filtering process performed by the qualification system 130 may significantly reduce the number of possible recommendations the optimization and recommendation engine 120 has to consider when selecting a recommendation to provide in the interaction. This may increase the processing speed of the optimization and recommendation engine 120 (e.g., because the optimization and recommendation engine 120 does not have to repeat the qualification process) and enable the optimization and recommendation engine 120 to provide faster (e.g., real-time) recommendations. In this regard, the qualification system 130 identifies and defines a set of qualified recommendations for the interaction and the optimization and recommendation engine 120 may quickly adapt and optimize recommendations during the interaction based on changes in the interaction (e.g., by analyzing only the qualified recommendations based on any changes).

The qualification system 130 may load the qualified recommendations in the cache 140 as the available output information 148. The optimization and recommendation engine 120 may access the qualified recommendations by accessing the available output information 148 from the cache. The available output information 148 may be indexed in the cache with an identifier that ties the available output information 148 (e.g., the qualified recommendations) to a particular customer or a particular interaction to enable relatively quick identification of the relevant information by the optimization and recommendation engine 120.

The cache 140 may be any type of electronic storage (e.g., random access memory) that enables relatively quick (e.g., as compared to disk memory devices) read and/or write accesses to the data stored in the cache 140. The data stored in the cache 140 may be highly customizable and adaptable using a graphical user interface (GUI). The data stored in the cache 140 may be arranged in objects and indexed to support parallel and efficient access (e.g., high performance access). The cache 140 may support partial updates to objects, parallel computing, distributed implementations that exist across several platforms, flexible definitions, and on-the-fly indexing.

During the interaction with the customer, the cache 140 may act as a state machine that tracks movement from one recommendation to another during the interaction. For instance, the optimization and recommendation engine 120 may cause the cache 140 to update when a recommendation is presented to the customer during the interaction to prevent the recommendation from being presented a second time in the interaction. In some implementations, the cache 140 may store a current recommendation that is continuously optimized for the current state of the interaction. In these implementations, when the optimization and recommendation engine 120 needs to provide a recommendation, the optimization and recommendation engine 120 may, because the current recommendation is optimized for the current state, access the current recommendation from the cache 140 without having to perform a full recommendation analysis. Further, in these implementations, the current recommendation may be fluid and change in response to changes in the interaction regardless of whether the current recommendation is presented to the customer (e.g., the customer may change the subject matter of the interaction prior to a particular optimized recommendation being presented and the current recommendation may be optimized based on the change in subject matter).

The cache 140 may store user objects 142, agent objects 144, interaction objects 146, and available output information 148. The user objects 142 represent information that is relevant to a user or customer that is engaged in an interaction with the application system The user objects 142 may include user or customer profile information, such as age, gender, race, past purchasing behavior, income level, past experience with recommendations, family attributes, geographic data, transactions history data (e.g., items previously purchased, financial transactions, etc.), etc. The user objects 142 may include business partner related attributes that typically reside in the master data. Each user object 142 may correspond to a particular user or customer and may be uniquely identified by a user identifier. Many user objects 142 may be stored in the cache 140 at any given time and may correspond to all users that are engaging in an interaction with an application system (e.g., the application system 110) or in a position in which the user may engage in an interaction shortly. For instance, a user object 142 may be loaded into the cache in response to a customer beginning an interaction (e.g., beginning to speak with an operator of a call center, logging onto a web site, etc.) or a user object 142 may be loaded into the cache in response to a detection that the customer may begin an interaction shortly (e.g., the user object may be loaded when a customer is on hold to speak with a call center operator, the user object may be loaded at a time when a customer has scheduled to speak with a customer service representative, even though the call has yet to be completed, the user object may be loaded in the cache when the user is expected, based on past experience, to initiate a new interaction, etc.).

The agent objects 144 represent information that is relevant to an agent that is engaged in an interaction with a customer using the application system 110. The agent objects 144 may include agent profile information (e.g., call center assignment, team, name, etc.), agent skill information, agent schedule information, etc. Each agent object 144 may correspond to a particular agent and may be uniquely identified by an agent identifier. Many agent objects 144 may be stored in the cache 140 at any given time and may correspond to all agents that are engaging in an interaction with a customer or in a position in which the agent may engage in an interaction shortly. For instance, an agent object 144 may be loaded into the cache in response to beginning an interaction with a customer (e.g., beginning to speak with a customer who has called into a call center) or an agent object 144 may be loaded into the cache in response to a determination that the agent may begin an interaction shortly (e.g., the agent object may be loaded when an agent is logged onto a terminal in a call center, the agent object may be loaded at a time when an agent is scheduled to work, etc.).

The interaction objects 146 represent information that is relevant to a particular interaction with a customer using the application system 110. The interaction objects 146 may include information defining the interaction, such as geographic location related to interaction, timing data related to the interaction (e.g., time the interaction began, how long the interaction has been occurring, etc.), communication channel, subject matter of interaction, data that identifies the customer and/or agent associated with the interaction, etc. Each interaction object 146 may correspond to a particular interaction and may be uniquely identified by an interaction identifier. Many interaction objects 146 may be stored in the cache 140 at any given time and may correspond to all interactions that are occurring. For instance, an interaction object 146 may be loaded into the cache in response an interaction with a customer beginning (e.g., beginning to speak with a customer who has called in to a call center). The interaction objects 146 may be updated based on changes in the corresponding interaction and reflect a current state of the corresponding interaction as well as a history of the corresponding interaction.

In some implementations, the interaction objects 146 may include multiple, different types of objects. For instance, the interaction objects 146 may include session customer objects that define attributes related to the customer provided during the session (e.g., channel, start and end time, offers made during the session, etc.). The interaction objects 146 also may include session agent objects that define attributes related to the agent provided during the session (e.g., agent ID, time the agent has been working with the customer, etc.). The interaction objects 146 further may include GMT objects that define locale related attributes (e.g., time zone).

The cache 140 may store any type of objects that include information that may be relevant to determining a recommendation to provide to a customer during an interaction. For instance, the cache 140 may store subscriber objects that define information related to hierarchical business partners (e.g. mobile customer with several handsets). The cache 140 also may store system objects that may be internal data objects and may not be available for the business user. The system objects may include parameters that are relevant for the computation process and may define attributes of related to operating characteristics of the system.

The available output information objects 148 were described above and store information related to qualified recommendations identified by the qualification system 130. For example, the available output information objects 148 may include offer objects that define attributes related to real-time offers that are made and/or under consideration. The optimization and recommendation engine 120 and the qualification system 130 may access any of the information stored in the cache 140 to perform operations described throughout this disclosure. The database 150 also may be updated based on updates made to data stored in the cache 140 (e.g., when a user ends an interaction, the database 150 may be updated with data from a user object in the cache that was updated prior to the user ending the interaction). Although the cache 140 has been described as storing user objects 142, agent objects 144, interaction objects 146, and available output information 148 separately, the cache 140 may store all of the information relevant to an interaction in a single object (e.g., an overall interaction object), in a subset of less than all of the user objects 142, agent objects 144, interaction objects 146, and available output information 148, or further additional objects to those shown in FIG. 1.

The optimization and recommendation engine 120 uses the data stored in the cache 140 to provide real-time optimal recommendations to the application system 110 in addition to other application systems (e.g., many different, application systems may be serviced by the optimization and recommendation engine 120). The optimization and recommendation engine 120 uses some combination of the user object data 142, the agent object data 144, and the interaction object data 146 to select a qualified recommendation from the available output information 148. The optimization and recommendation engine 120 may use any type of technique (or combination of techniques) to select optimal recommendations (e.g., the optimization and recommendation engine 120 may use data mining techniques, declarative rules, a hypothesis-based recommendation process, etc.). The optimization and recommendation engine 120 may consider a combination of expected response from the customer and value of acceptance of the recommendation to the organization in selecting a recommendation. After selecting a recommendation, the optimization and recommendation engine 120 sends the selected recommendation to the application system 110 and the application system 110 enables presentation of the recommendation to a customer.

The application system 110 provides feedback or interaction information (e.g., continuously or in response to changes in the interaction) to the optimization and recommendation engine 120 during the interaction with the customer and the optimization and recommendation engine 120 adapts and optimizes the selected recommendation based on the feedback or interaction information. The optimization and recommendation engine 120 may provide many recommendations to the application system 110 during a given interaction. The optimization and recommendation engine 120 may provide a new recommendation to the application system 110 in response to a change in the interaction (or confirm that the previously provided recommendation remains optimal) or may provide a new recommendation to the application system 110 in response to a request from the application system 110.

One or more of the components of the system 100 (e.g., the application system 110, the optimization and recommendation engine 120, the qualification system 130, the cache 140, and the database 150) each may be a general-purpose computer (e.g., a desktop personal computer, a workstation, or a laptop computer) that is configured to communicate with other devices over a network. In some implementations, one or more of the components may be mobile or wireless devices. One or more of the components also may be special purpose computers or hardware devices, such as processors. One or more of the components further may be executable programs that are implemented in hardware. Although the system 100 has been defined as separate components, all of the components may be part of a single system or computer, additional components may be included in the system, and a subset of the components may be used to perform the operations of the system 100.

Figure 2:
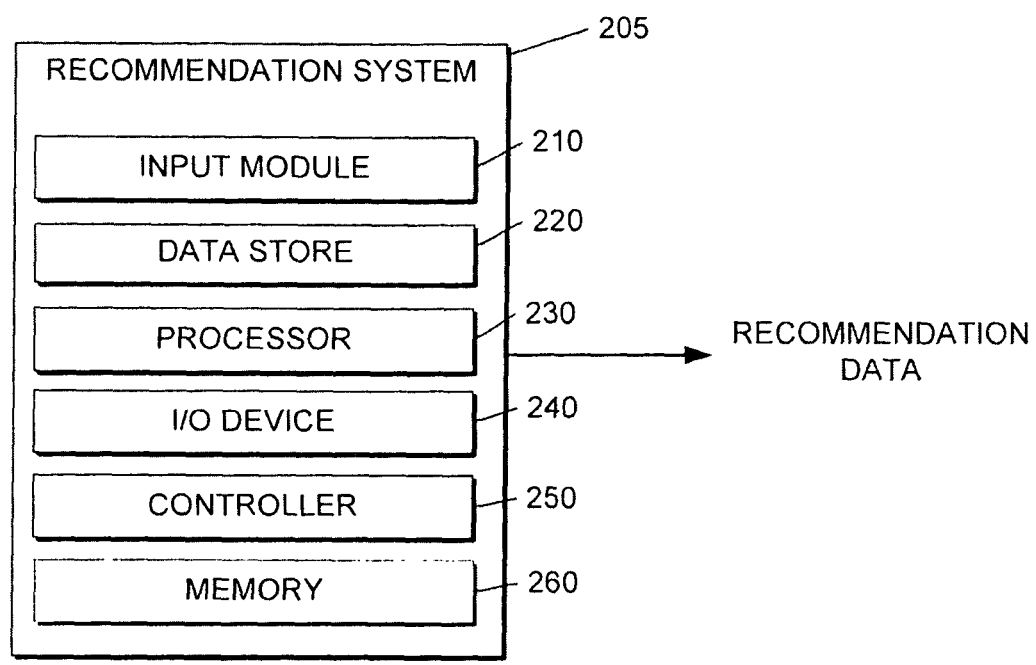

Referring to FIG. 2, a block diagram 200 of a recommendation system 205 is shown. The system 205 includes an input module 210, a data store 220, a processor 230, an I/O device 240, a controller 250, and a memory 260. The recommendation system 205 may be used to provide recommendations starting from a hypothesis and adapt the hypothesis based on feedback data collected from previous recommendations. The recommendation system 205 may be implemented within hardware or a combination of hardware and software.

The input module 21 0 imports data associated with a process. The data may include data resulting from a particular process (e.g., hypothesis data and/or feedback data). The data also may be received over a network or input by a user.

The data may include data acquired from outside of the process. In some implementations, the input module 210 receives data from a source external to the system 205. The input module 210 also may receive data from a source within the system 205, and further may access data, either from within the system 205 or from a source external to the system 205. In some implementations, the input module 210 reformats and/or transforms the data such that the data may be processed and stored by other components within the system 205.

The recommendation system 205 also includes a data store 220. In some implementations, data from the input module 210 is stored in the data store 220. The data store 220 may be, for example, a relational database that logically organizes data into a series of database tables. The data included in the data store 220 may be, for example, data resulting from a particular process (e.g., hypothesis data and/or feedback data). Each database table arranges data in a series of columns (where each column represents an attribute of the data stored in the database) and rows (where each row represents attribute values). The data store 220 may be, for example, an object-oriented database that logically or physically organizes data into a series of objects. Each object may be associated with a series of attribute values. The data store 220 also may be a type of database management system that is not necessarily a relational or object-oriented database. For example, a series of XML (Extensible Mark-up Language) files or documents may be used, where each XML file or document includes attributes and attribute values. Data included in the data store 220 may be identified by a unique identifier such that data related to a particular process may be retrieved from the data store 220.

The recommendation system 205 also includes the processor 230. The processor 230 may be a processor suitable for the execution of a computer program such as a general or special purpose microprocessor, and any one or more processors of any kind of digital computer. Generally, a processor receives instructions and data from a read-only memory or a random access memory or both. The processor 230 receives instructions and data from the components of the recommendation system 205 to, for example, output and store recommendations. In some implementations, the recommendation system 205 includes more than one processor.

The recommendation system 205 also includes the I/O device 240, which is configured to allow a user selection. For example, the I/O device 240 may be a mouse, a keyboard, a stylus, or any other device that allows a user to input data into the recommendation system 205 or otherwise communicate with the recommendation system 205. In some implementations, the user may be a machine and the user input may be received from an automated process running on the machine. In other implementations, the user may be a person. The I/O device 240 also may include a device configured to output recommendation data.

The recommendation system 205 also includes the controller 250. The controller 250 is an interface to a process. The controller 250 may receive feedback from the process, such as feedback data related to success of recommendations. The controller 250 also may cause changes in the system in response to the feedback, such as, for example, validating or adapting hypothesis data.

The recommendation system 205 also includes a memory 260. The memory 260 may be any type of machine-readable storage medium. The memory 260 may, for example, store the data included in the data store 220. In some implementations, the memory 260 may store instructions that, when executed, cause the system 205 to provide recommendations using a hypothesis and adapt the hypothesis based on feedback data.

Although the example recommendation system 205 is shown as a single integrated component, one or more of the modules and applications included in the recommendation system 205 may be implemented separately from the system 205 but in communication with the system 205. For example, the data store 220 may be implemented on a centralized server that communicates and exchanges data with the recommendation system 205.

Figure 3:
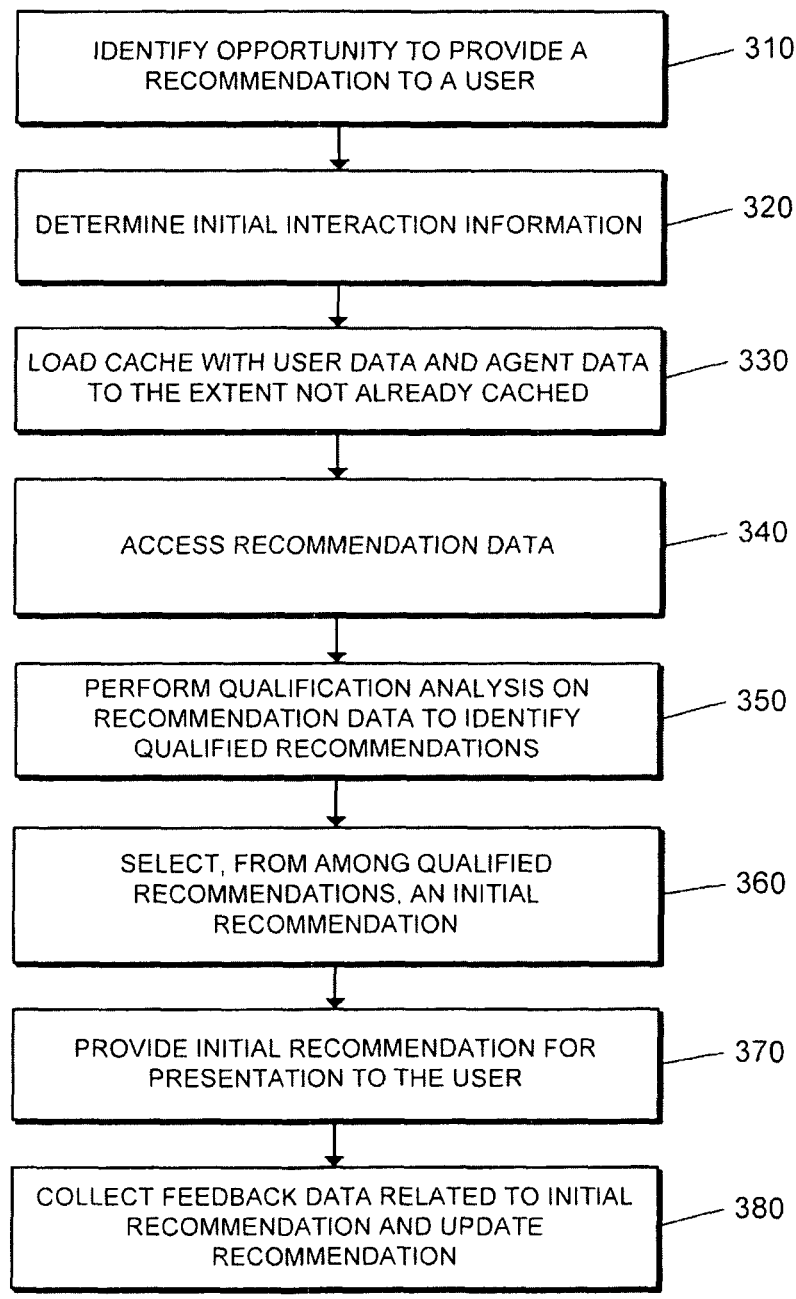
FIGS. 3, 5, and 7 are flowcharts of exemplary processes.

FIG. 3 illustrates an example of a process 300 for providing recommendations. The operations of the process 300 are described generally as being performed by the recommendation system 205. In some implementations, operations of the process 300 may be performed by one or more processors included in one or more electronic devices.

The system 205 identifies an opportunity to provide a recommendation to a user (310). For instance; the system 205 may detect initiation of an interaction between a user and an application system (or agent of an application system). The system 205 also may monitor an ongoing interaction between a user and an application system (or agent of an application system) and identify a portion of the interaction in which a recommendation (e.g., offer) may be provided to the user without annoying the user.

The system 205 determines initial interaction information (320). For example, the system 205 determines a communication channel (e.g., Internet, telephone, in person, etc.) associated with the interaction with the user and determines a reason that the user initiated the interaction (e.g., a help request, an information request, a complaint, etc.). The system 205 may automatically, without human intervention, detect the initial interaction information (e.g., automatically detect a communication channel or automatically detect subject matter of an interaction using voice recognition techniques). The system 205 also may determine the initial interaction information by receiving the initial interaction information from an application system that is directly involved in the interaction.

The system 205 loads a cache with user data and agent data to the extent the user data and the agent data is not already cached (330). For example, the system 205 may identify the user and the agent participating in an identified interaction and access corresponding user data and agent data from an electronic data store (e.g., a database). In this example, the system 205 may index the accessed user data and the accessed agent data and format the accessed user data and the accessed agent data into objects for storage in the cache.

In some implementations, the system 205 may pre-load data into the cache. In these implementations, the system 205 checks the cache to determine whether the relevant user data and agent data already is stored in the cache. When the relevant data is stored in the cache, the system 205 may use the pre-loaded data and may not load the user data and the agent data in the cache.

The system 205 may pre-load the cache with user data and agent data prior to identifying an interaction. For instance, agent data may be indexed, formatted into an agent object, and stored in the cache any time the agent is scheduled to work or any time the agent is logged into a system that enables the agent to interact with users. The user data may be indexed, formatted into a user object, and stored in the cache any time the user is scheduled to engage in an interaction with an application system (or agent), any time the user begins a process that may lead to an interaction (e.g., logs on to a web site, but does not begin an online chat system with an agent or calls into a call center and is placed on hold), or any time the system 205 anticipates the user will initiate an interaction based on past experience or detected events (e.g., the system 205 may cache user data one day after the user purchases a product because users in the past typically engage in a registration interaction one day after purchase of the product, the system 205 may cache user data when the system 205 detects a malfunction in a product of the user that is remotely monitored by the system 205 because the user is likely to begin a help desk interaction in an attempt to resolve the malfunction, etc.).

The system 205 also may load the initial interaction information to the cache. For instance, the system 205 may load the initial interaction information to the cache as part of an interaction object that is used to track the status of the interaction and store real-time interaction information that reflects the current status of the interaction.

The system 205 accesses recommendation data (340). The system 205 may access recommendation data from an electronic data store (e.g., a database) or receive recommendation data in electronic communications from another device (perhaps, over a network). The recommendation data may include offers for goods or services, suggestions for activities, or any other type of recommendation in which a user may be interested.

The system 205 performs qualification analysis on recommendation data to identify qualified recommendations (350). For instance, the system 205 analyzes the recommendation data and identifies recommendations that are qualified for presentation in the interaction. The qualified recommendations may represent a subset (perhaps, a very small subset) of all of the recommendations defined in the recommendation data. The system 205 may compare criteria, parameters, and eligibility rules of the available recommendations to user data, agent data, and information indicating aspects of the current interaction and identify qualified recommendations (e.g., those recommendations that are applicable to the user data, agent data, and information indicating aspects of the current interaction) based on the comparison. The system 205 may perform qualification analysis on recommendation data to identity qualified recommendations as described in the example shown in FIG. 4.

The system 205 selects, from among qualified recommendations, an initial recommendation (360). The system 205 may use some combination of the user data, the agent data, and the initial interaction information to select a qualified recommendation from the qualified recommendations identified in the qualification analysis. The system 205 may use any type of technique (or combination of techniques) to select optimal recommendations. For instance, the system 205 may use offline analytics, customer information, data mining techniques, declarative rules, and/or a hypothesis-based recommendation process to select an initial recommendation. As described with respect to FIG. 5, the system 205 may consider a combination of expected response from the customer and value of acceptance of the recommendation to the organization in selecting a recommendation and may select the optimal recommendation.

The system 205 may select an initial recommendation that is suitable for the communication channel associated with the interaction with the user. For example, the system 205 may select a web-based offer when the communication channel is a web site being accessed over a network. The system 205 also may select a first recommendation over a second recommendation when, although both the first and second recommendations may be presented over the communication channel associated with the interaction, the first recommendation has proven to be more effective over the communication channel than the second recommendation.

The system 205 further may select an initial recommendation that accounts for the reason that the user initiated the interaction. For instance, when the user initiated the interaction to receive help with a product (e.g., called a help desk), the system 205 may select a recommendation that offers the user a guide to using the product, a training course related to using the product, or a service/maintenance plan that would assist the user in using the product.

The system 205 provides the selected initial recommendation for presentation to the user (370). For example, the system 205 sends (e.g., over a network) the selected recommendation to an application system handling the interaction with the user. The application system then directly presents the recommendation to the user (e.g., displays the recommendation on a web site) or enables an agent to provide the recommendation to the user (e.g., the application system displays the recommendation on a terminal in a call center associated with the agent handling the interaction to enable the agent to present the recommendation to the user over a telephone call). The system 205 may be handling the interaction itself and, in that case, may display or otherwise output the recommendation to the user or an agent that relays the recommendation to the user.

The system 205 collects feedback data related to the initial recommendation and provides an updated recommendation (380). For instance, the system 205 may receive feedback data from an application system that reflects the user's response to the initial recommendation. The feedback data may indicate whether the user accepted the initial recommendation, declined the initial recommendation, or did not make a decision on the initial recommendation (e.g., indicated that more time was needed to consider the recommendation). The feedback data also may include data indicating the user's consideration of the initial recommendation (e.g., how long the user considered the recommendation prior to accepting or rejecting the recommendation) and data indicating the interest level the user showed in the recommendation.

Figure 7:
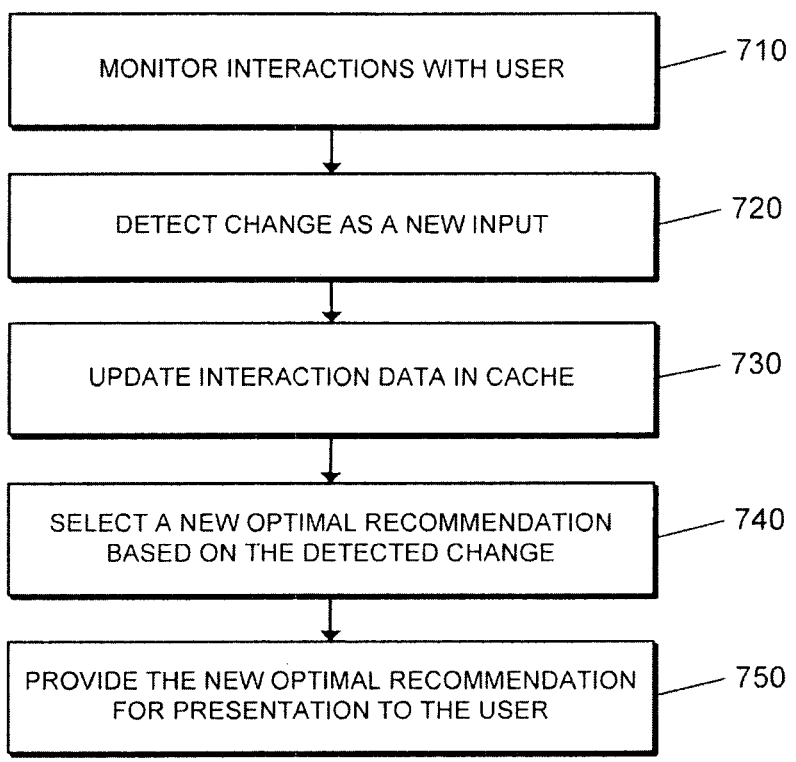

The system 205 also may collect feedback data that relates to other aspects of the interaction with the user. For example, the system 205 may collect information that relates to the interaction irrespective of the initial recommendation (e.g., the subject matter of the interaction, the user's mood during the interaction, any new information learned about the user through the interaction, etc.). The system 205 may use the collected feedback to update the recommendation provided to the user. Updating the recommendation may involve selecting a different recommendation that accounts for the feedback data and new information learned about the user and/or the interaction through the feedback data. FIG. 7 illustrates an example of a process 700 that collects feedback data and provides optimized, updated recommendations based on the feedback data.

Figure 4:
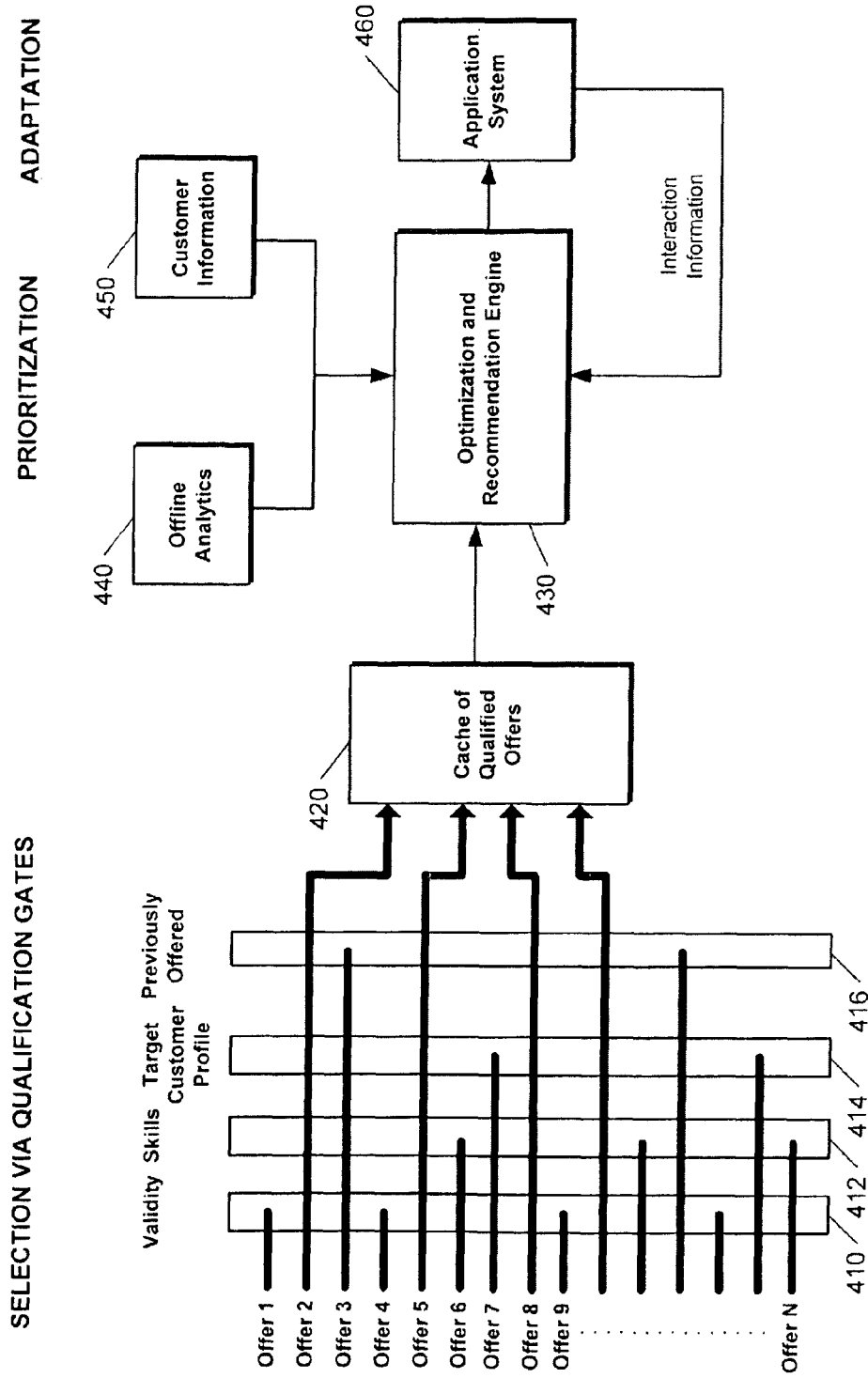
FIGS. 4 and 6 are exemplary diagrams.

FIG. 4 illustrates an example of identifying qualified recommendations and selecting a recommendation to present in an interaction with a user. As shown, qualified or eligible offers are selected using qualification gates 410 to 416. The qualification gate 410 determines whether the offer is valid for the interaction. For instance, offers that have expired are no longer valid and, therefore, filtered by the qualification gate 410. The qualification gate 410 also may filter offers that are not valid over the communication channel used in the interaction and may filter offers that the user in the interaction is not eligible to receive (e.g., the offer only applies to users in a preferred customer loyalty program and the user in the interaction is not part of the preferred customer loyalty program). In addition, the qualification gate 410 may filter offers that are not valid for a time corresponding to the interaction (e.g., the qualification gate 410 may filter offers that are presented in the morning when the interaction is occurring at night) and may filter offers that are not valid for a geographic location corresponding to the interaction (e.g., the qualification gate 410 may filter offers that are only good (or associated with retailers only located in) a particular state when the location of the user in the interaction is not the particular state).

The qualification gate 412 determines whether the skills of the agent are acceptable for the offers. For instance, some offers may require the agent presenting the offer to possess particular skills (e.g., a particular type of college degree, a particular type of past work experience, attendance of a particular training session, etc.). When the qualification gate 412 detects that the agent does not possess the skills required by an offer (e.g., by identifying the skills of the agent and comparing the identified skills to skills defined by the offer), the qualification gate 412 filters the offer.

The qualification gate 414 determines whether a profile of the customer engaging in the interaction has a profile that matches target profiles of the available offers. For instance, some offers may be targeted to particular users and, therefore, may require the customer receiving the offer to have certain profile information (e.g., a particular age, a particular gender, a particular past experience, etc.). When the qualification gate 414 detects that the customer does not have a profile required by an offer (e.g., by identifying the profile of the customer and comparing the identified profile to a target profile defined by the offer), the qualification gate 414 filters the offer.

The qualification gate 416 determines whether an offer has been previously presented to the customer engaging in the interaction in the past. For instance, the qualification gate 416 may access tracked information related to past offers that have been presented to the user and compares the previously presented offers to a list of available offers. When one of the available offers matches a previously presented offer, the qualification gate 416 filters the offer.

As shown, only the offers that pass all of the qualification gates 410 to 416 are identified as qualified offers and stored in the cache 420 of qualified others. The cache 420 may be similar to the cache 140 described above with respect to FIG. 1, the optimization and recommendation engine 430 may be similar to the optimization and recommendation engine 120 described above with respect to FIG. 1, and the application system 460 may be similar to the application system 110 described above with respect to FIG. 1.

The optimization and recommendation engine 430 may access analytical information (e.g., identified rules or correlations) that have been determined by the offline analytics system 440, access customer information from the customer information data store 450, and receive interaction information from the application system 460. The optimization and recommendation engine 430 may then access the qualified offers from the cache 420 and identify in optimal offer to recommend to the application system 460 (e.g., the qualified offer that best matches the analytical information, the customer information, and the interaction data).

Figure 5:
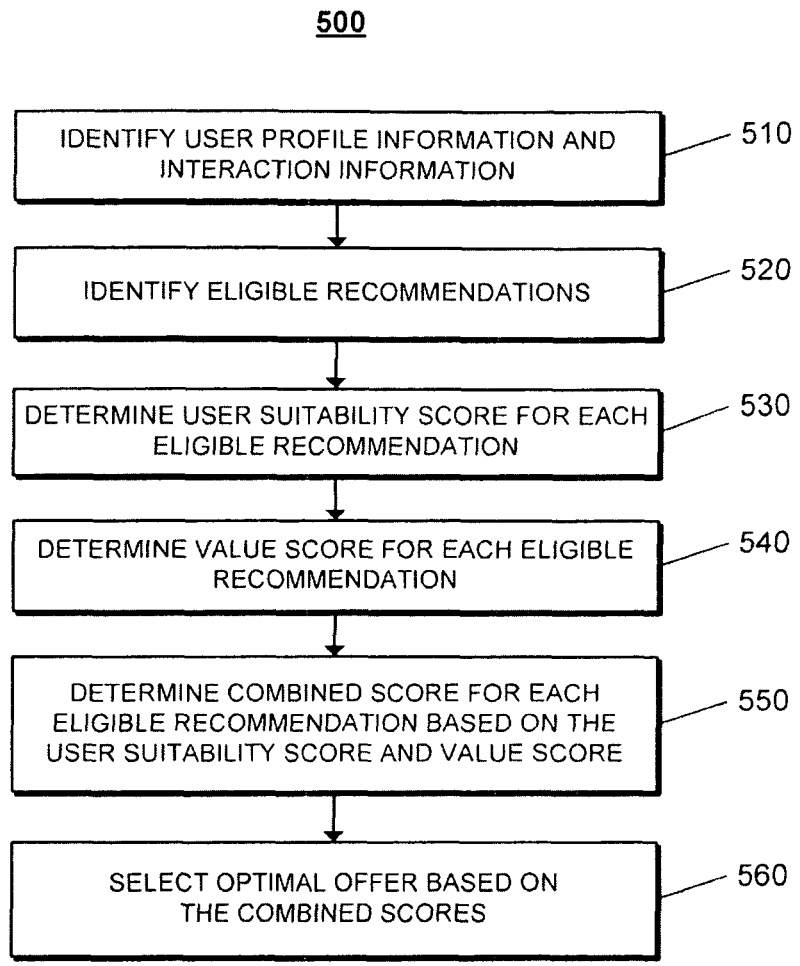

FIG. 5 illustrates an example of a process 500 for selecting recommendations. The operations of the process 500 are described generally as being performed by the recommendation system 205. In some implementations, operations of the process 500 may be performed by one or more processors included in one or more electronic devices.

The system 205 identifies user profile information and interaction information (510). For instance, the system 205 identifies a user in a position to receive a recommendation and accesses user profile information for the identified user. The system 205 may access the user profile information from electronic storage (e.g., a database or a cache) or may receive the user profile information in electronic communications over a network (e.g., download, over the Internet, the user profile information associated with the identified user from a service provider that provides user profile information).

The system 205 may identify interaction information by determining a communication channel (e.g., Internet, telephone, in person, etc.) associated with the interaction with the user and determining a reason that the user initiated the interaction (e.g., a help request, an information request, a complaint, etc.). The system 205 may automatically, without human intervention, identify the interaction information (e.g., automatically detect a communication channel, automatically detect subject matter of an interaction using voice recognition techniques, or automatically detect a portion of web site a user is accessing). The system 205 also may identify the interaction information by receiving the interaction information from an application system that is directly involved in the interaction.

The system 205 identifies eligible recommendations (520). The system 205 may identify eligible recommendations by comparing the user profile information and the interaction information to eligibility rules associated with available recommendations. The system 205 may identify eligible recommendations using techniques similar to those described above with respect to numeral 340 in FIG. 3 and with respect to numerals 410 to 416 shown in FIG. 4.

The system 205 determines a user suitability score for each eligible recommendation (530). For example, the system 205 may compare the identified user profile information to profiles associated with each eligible recommendation and determine a suitability score based on whether (and the extent to which) the identified user profile information matches profiles associated with eligible recommendations. In this example, each eligible recommendation may be associated with one or more profiles and have scores that correspond to the associated one or more profiles. The scores may reflect how likely a person with the associated profile is to accept the recommendation. As such, each profile has a score and the system 205 uses in determining the user suitability score when the profile of the user matches the profile associated with the score. When multiple user profiles, match multiple profiles of an eligible recommendation, the system 205 may determine multiple profile-specific user suitability scores for the recommendation or may compute a single user suitability score for the recommendation that accounts for all of the scores of the multiple matching profiles (e.g., a summation of all of the scores).

The system 205 also may account for information other than the user profile in determining the user suitability score. Specifically, because the user suitability score measures the user's expected response to the recommendation, the system 205 may account for any information that impacts the user's expected response to the recommendation. For instance, the system 205 may assess the skills of the agent presenting the eligible recommendations (e.g., an agent may be better at presenting a first type of recommendation than a second type of recommendation). In addition, the system 205 may assess interaction information in determining the user suitability score. The system 205 may assign a higher score to a first recommendation that is related to the subject matter of the interaction than a second recommendation that is not related to the subject matter of the interaction.

The system 205 determines a value score for each eligible recommendation (540). The system 205 determines a value score that reflects the value of the user accepting the recommendation to the organization offering the recommendation. For instance, the recommendation may be an offer and the value score may be proportional to the profit to the organization resulting from the user's acceptance of the offer. The profit may be profit achieved by a manufacturer or retailer selling a good related to the offer or may be profit made by a marketing company in response to the user accepting the offer (e.g., a first offer for which the marketing company receives ten cents upon user acceptance may have twice the value score as compared to a second offer for which the marketing company receives five cents upon user acceptance). The value score also may reflect goodwill or potential for repeat business resulting from user acceptance of an offer. The system 205 may assign value scores to offers based on user input that defines the value or the system 205 may automatically, without human intervention, assign value scores to offers based on the data defining offers. The system 205 may determine a value score for an eligible recommendation by accessing a value score stored in association with the eligible recommendation.

The system 205 determines a combined score for each eligible recommendation based on the user suitability score and the value score (550). For example, the system 205 uses a mathematical process to combine the user suitability score and the value score to arrive at a single combined score (e.g., add the two scores, multiply the two scores, etc.). Any type of process made be used to determine a combined score for each eligible recommendation based on the user suitability score and the value score as long as the combined score reflects a combination of expected response and value to the organization.

The system 205 selects, from among eligible recommendations, an optimal offer based on the combined scores (560). For instance, the system 205 compares the combined scores for all of the eligible recommendations and selects the eligible recommendation that has the highest combined score. By selecting the eligible recommendation that has the highest combined score, the system 205 selects the recommendation that has an optimal combination of expected response and value to the organization. When a tie exists for the highest combined score, the system 205 may compare the user suitability scores for the tied recommendations and select the recommendation with the highest user suitability score (e.g., the recommendation with the best expectation of success). Alternatively, when a tie exists for the highest combined score, the system 205 may compare the value scores for the tied recommendations and select the recommendation with the highest value score (e.g., the recommendation with the best value).

Figure 6:
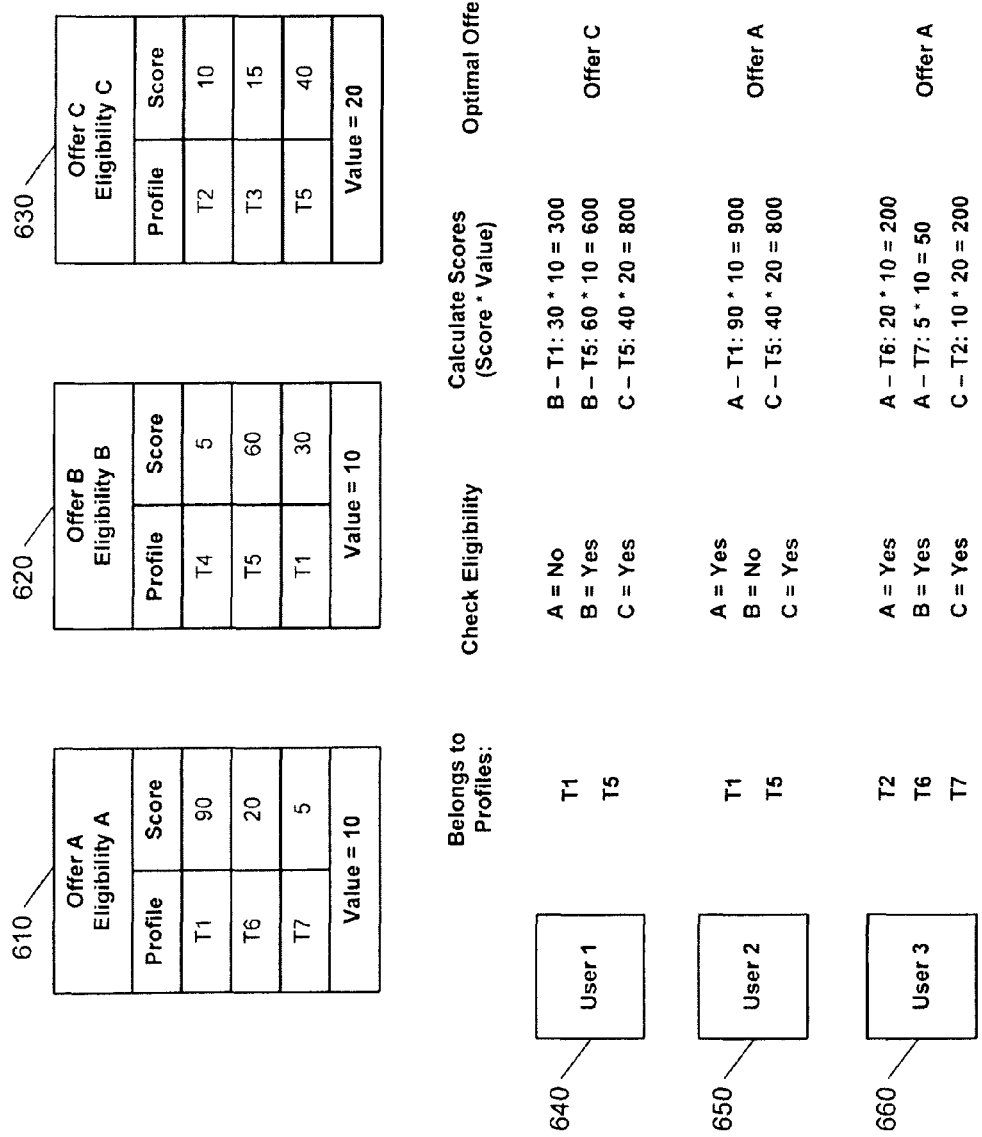

FIG. 6 illustrates an example of selecting a recommendation to present in an interaction with a user using combined user suitability scores and value scores. As shown, the system 205 has three available offers: Offer A 610, Offer B 620, and Offer C 630. The Offer A 610 requires eligibility rule A to be satisfied for Offer A 610 to be an eligible recommendation, the Offer B 620 requires eligibility rule B to be satisfied for Offer B 610 to be an eligible recommendation, and the Offer C 630 requires eligibility rule C to be satisfied for Offer C 630 to be an eligible recommendation. Each of the offers (Offer A 610, Offer B 620, and Offer C 630) is associated with three user profiles that each have a corresponding user suitability score that is applied when the corresponding profile is met. In addition, each of the offers (Offer A 610, Offer B 620, and Offer C 630) is associated a value score that is applied when determining whether to accept the corresponding offer.

To illustrate, selection of a recommendation to present in an interaction with a user using combined user suitability scores and value scores is shown for three example users. First, an optimal offer is selected for User 1 640, who belongs to profiles T1 and T5. The User 1 640 does not meet the eligibility requirement A, so Offer A 610 is not an eligible recommendation and, thus, is not available for selection despite being associated with a profile to which the User 1 640 belongs and having a relatively high user suitability score for the matching profile (i.e., T1). In selecting between Offer B 620 and Offer C 630 (the eligible offers), the system 205 determines a user suitability score for Offer B 620, profile T1 of 30, a user suitability score for Offer B 620, profile T5 of 60, and a user suitability score for 30 Offer C 630, profile T5 of 40. In addition, the system 205 determines a value score for Offer B 620, profile T1 of 10, a value score for Offer B 620, profile T5 of 10, and a value score for Offer C 630, profile T5 of 20. To compute a combined score, the system 205 multiplies the determined user suitability score and the value score. This results in a combined score for Offer B 620, profile T1 of 300, a combined score for Offer B 620, profile T5 of 600, and a combined score for Offer C 630, profile T5 of 800. Based on the combined scores, the system 205 Selects Offer C 630 as the optimal offer because Offer C 630 has the highest combined score, even though the Offer C 630 does not have the highest user suitability score.

In some implementations, instead of computing a combined score for each matching profile of an offer, the system 205 may determine a single combined score for each offer that matches any one or more of the user profiles. In these implementations, when a single offer is associated with multiple matching profiles, the system 205 may combine (e.g., sum) the user suitability scores for each of the matching profiles into single user suitability score. Applying this technique to the example shown in FIG. 6, the Offer B 620 would be associated with two matching profiles and have a combined user suitability score of 90(30+60). When the combined user suitability score of 90 is multiplied by the value score of 10, the system 205 determines that Offer B 620 has a combined score or 900. Accordingly, using this technique. Offer B 620 is the optimal offer for the User 1 640.

Second, an optimal offer is selected for User 2 650, who belongs to profiles T1 and T5. The User 2 650 does not meet the eligibility requirement B, so Offer B 620 is not an eligible recommendation and, thus, is not available for selection despite being associated with two profiles to which the User 2 650 belongs. In selecting between Offer A 610 and Offer C 630 (the eligible offers), the system 205 determines a user suitability score for Offer A 610 of 90 and a user suitability score for Offer C 630 of 40. In addition, the system 205 determines a value score for Offer A 610 of 10 and a value score for Offer C 630 of 20. To compute a combined score, the system 205 multiplies the determined user suitability score and the value score. This results in a combine(d score for Offer A 610 of 900 and a combined score for Offer C 630 of 800. Based on the combined scores, the system 205 selects Offer A 610 as the optimal offer because Offer A 610 has the highest combined score, even though the Offer A 610 does not have the highest value score.

Third, an optimal offer is selected for User 3 660, who belongs to profiles T2, T6, and T7. The User 3 660 meets the eligibility requirements of all available offers. In selecting between Offer A 610, Offer B 620, and Offer C 630 (the eligible offers), the system 205 determines a user suitability score for Offer A 610, profile T6 of 20, a user suitability score for Offer A 610, profile T7 of 5, and a user suitability score for Offer C 630, profile T2 of 10. The Offer B 620 is not associated with a matching profile and, therefore, is not selected by the system 205. In addition, the system 205 determines a value score for Offer A 610, profile T6 of 10, a value score for Offer A 610, profile T7 of 10, and a value score for Offer C 630, profile T2 of 20. To compute a combined score, the system 205 multiplies the determined user suitability score and the value score. This results in a combined score for Offer A 610, profile T6 of 200, a combined score for Offer A 610, profile T7 of 50, and a combined score for Offer C 630, profile T2 of 200. Based on the combined scores, the system 205 determines that a tie exists for the highest combined score and the results of the combined score analysis is inconclusive. In breaking the tie, the system 205 may select Offer A 610 as the optimal offer because Offer A 610 has a higher user suitability score (20) than Offer C 630 (10). Alternatively, in breaking the tie, the system 205 may select Offer A 610 as the optimal offer because Offer A 610 has a second matching profile and the Offer C 630 does not.

FIG. 7 illustrates an example of a process 700 for optimizing recommendations. The operations of the process 700 are described generally as being performed by the recommendation system 205. In some implementations, operations of the process 700 may be performed by one or more processors included in one or more electronic devices.

The system 205 monitors interactions with a user (710). The system 205 may monitor interactions with the user automatically, without human intervention. For instance, the system 205 may electronically track which portions of a web site the user has been accessing during the interaction and which portion the user is currently accessing during the interaction. The system 205 also may monitor the subject matter of the interaction by, for example, using voice recognition technology to analyze a conversation between a user and an agent of a call center during an interaction. The system 205 may continuously detect a mood of the user during the call, may continuously detect the topic of conversation during the call (e.g., a complaint, an information request, etc.), and may detect changes that occur during the interaction (e.g., a change in the topic of conversation during the call).

In some implementations, the system 205 monitors interactions at least in part based on user input provided by an agent handling the interaction. For instance, the system 205 may receive user input from an agent in a call center or an agent handling an in person interaction that indicates the reason for the interaction (e.g., a complaint, a request for information, to complete a purchase, etc.). The system 205 may process the user input and determine a state of the interaction based on the user input. The agent may be able to enter the user input in a customized graphical user interface that enables the agent to provide input quickly and effectively (e.g., select the reason for the interaction from a list of common reasons for the interaction.

The agent further may input customized information about the interaction that may impact a decision on what type of recommendation to provide to the user. For example, in a call center interaction, the user may indicate that the user only has a short period of time to handle the call (e.g., five minutes). In this example, the agent may enter this information into the system 205 and the system 205 may use this information to select recommendations (e.g., limit the selected recommendation to a short offer or one that does not take much processing time if the user was to accept the offer).

In addition, the agent may input customer attribute information gleaned from interacting with the customer that may not have previously been known. For instance, in an in person interaction, the agent may input information related to products the agent observed in relation to the user (e.g., the type of watch the user is wearing, the car the user drives, etc.). The agent also may input physical attribute information related to the user determined based on perceiving the user (e.g., length/color of the user's hair, the user's height, etc.). In a call center interaction, the agent may input information gleaned from the user's voice (e.g., whether the user is male or female, whether the user has an accent that suggests geographic location of the user, etc.). Each time the agent notices a new characteristic of the interaction, the agent may input information describing the new characteristic and the recommendations provided may be optimized for the new characteristic.

Further, in some implementations, the system 205 may electronically monitor interactions related to aspects of the service being provided in the environment in which the interaction is occurring. For instance, when the interaction is a telephone call being handled by a call center, the system 205 may electronically monitor and track conditions of the call center's ability to effectively handle calls (e.g., the volume of calls being handled, the average wait time to speak to an agent, etc.). Similarly, in an online environment, the system 205 may monitor the responsiveness of the web site with which the user is interacting (e.g., how quickly pages are being served from the web site, whether links within the website are broken, etc.). The system 205 also may electronically monitor and track interaction on a user-specific basis (e.g., the wait time of a specific user of a call center) and may consider service provided to the user in past interactions (e.g., average wait time for the specific user for all (or a threshold number) of past calls placed to the call center).

The system 205 may monitor whether or not users accept recommendations (e.g., offers) made by the system 205 during the interaction. For example, the system 205 may receive, over a network and from an application system, feedback related to the user's reaction to a recommendation provided by the system 205. The feedback may reflect whether the user accepted the recommendation, rejected the recommendation outright, or whether the user responded to the recommendation with something other than an outright acceptance or rejection (e.g., the user indicates that the user will consider the recommendation, but cannot make a decision on the spot, the user proposes an alternative to the recommendation, etc.). The system 205 may use this information as feedback data and provide future recommendations based on the feedback data. The system 205 also may monitor interactions by receiving other types of information (e.g., information similar to the that discussed above) from an application system handling the interaction.

The system 205 detects a change in the interactions as a new input to use in selecting recommendations (720). For instance, the system 205 may automatically, without human intervention, detect that a user moves to a different section of a website while browsing the website and use the change in sections of the website as a new input in identifying an optimal recommendation (e.g., select a new recommendation that is related to the different section of the website). The system 205 also may detect that the user has made a complaint about price of a good or service during the interaction, and exclude recommendations associated with a good or service that has a relatively high place based on the complaint. The system 205 further may detect a change in the service being provided in an environment in which the interaction with the user is occurring (e.g., a call center is overwhelmed) and select a new recommendation based on the detected change in the service being provided (e.g., only provide recommendations for retention offers when the call center is overwhelmed and providing below average service).

The system 205 updates interaction data in the cache based on the detected change (730). For example, the system 205 may identify interaction data that is stored in the cache and that is associated with the interaction and update the identified interaction data to include information descriptive of the detected change. In this example, the system 205 may partially update, in the cache, an interaction data object corresponding to the interaction and update an index of the cache on-the-fly.

The system 205 selects a new optimal recommendation based on the detected change (740). The system 205 may use some combination of the user data, the agent data, and the changed interaction information to select a qualified recommendation from among qualified recommendations identified in a qualification analysis. The system 205 may use any type of technique (or combination of techniques) to select optimal recommendations. For instance, the system 205 may use offline analytics, customer information, data mining techniques, declarative rules, and/or a hypothesis-based recommendation process to select a new optimal recommendation. As described with respect to FIG. 5, the system 205 may consider a combination of expected response from the customer and value of acceptance of the recommendation to the organization in selecting a new recommendation and may select the optimal recommendation.

The system 205 further may select a new optimal recommendation that accounts for a change in the subject matter of the interaction. For instance, the system 205 may determine that an offer for a high price item is optimal for a particular user based on the user data, the agent data, and the interaction information known at the time the high price item is identified as being optimal. When the system 205 detects a change that the user has made a complaint about the price of an item, the system 205 changes the optimal recommendation. Specifically, based on the user's complaint, the system 205 may determine that the offer for the high price item is not the optimal recommendation in light of the user's complaint about price and may identify an offer for a lower price item as the new optimal recommendation based on the detected change.

The optimal recommendation identified by the system 205 may change fluidly as new information related to the interaction and the user is received (e.g., changes are detected). The system 205 may update the optimal recommendation by processing new information as soon as it is received and leveraging information previously stored in the cache, which the system 205 may access quickly. In this regard, the system 205 may update and provide optimal recommendations in real-time and take advantage of any changes that occur in the interaction.

The system 205 provides the new optimal recommendation for presentation to the user (750). For example, the system 205 sends (e.g., over a network) the new optimal recommendation to an application system handling the interaction with the user. The application system then directly presents the recommendation to the user (e.g., displays the recommendation on a web site) or enables an agent to provide the recommendation to the user (e.g., the application system displays the recommendation on a terminal in a call center associated with the agent handling the interaction to enable the agent to present the recommendation to the user over a telephone call). The system 205 may be handling the interaction itself and, in that case, may display or otherwise output the recommendation to the user or an agent that relays the recommendation to the user.

Figure 8:
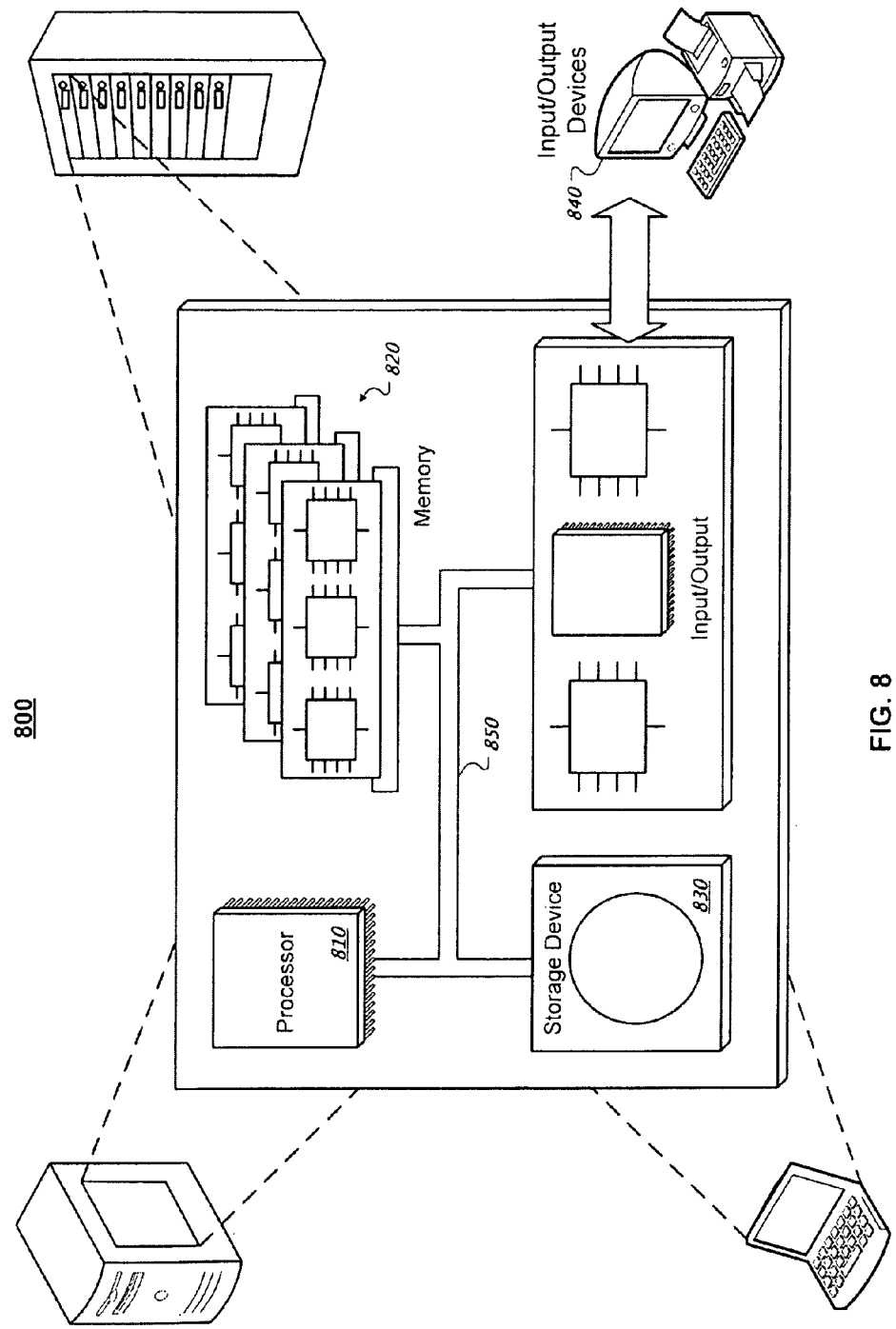

FIG. 8 is a schematic diagram of a generic computer system 800. The system 800 can be used for the operations described in association with any of the computer-implemented methods described previously. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In some implementations, the memory 820 is a computer-readable storage medium. In one implementation, the memory 820 is a volatile memory unit. In another implementation, the memory 820 is a non-volatile memory unit.

The storage device 830 is capable of providing mass storage for the system 800. In some implementation, the storage device 830 is a computer-readable storage medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. An apparatus can be implemented in a computer program product tangibly embodied in a machine-readable storage device, for execution by a programmable processor; and method steps can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and a sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks: and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include. e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless., it will be understood that various modifications may be made without departing from the spirit and scope of this disclosure. Accordingly, other implementations are within the scope of the following claims.

What is claimed is:

1. A system comprising:
a processor;
an optimization and recommendation engine configured to identify an interaction with a user that presents an opportunity to provide a recommendation to the user;
an electronic data store configured to store recommendation data associated with available recommendations;
a qualification system configured to access, from the electronic data store,
recommendation data associated with available recommendations and perform qualification analysis on the accessed recommendation data to identify recommendations for which the user corresponding to the identified interaction is qualified, wherein the qualification system generates a subset of recommendations from among the available recommendations based on the qualification analysis that identifies one or more recommendations for which the user is qualified, wherein performing the qualification analysis on the accessed recommendation data to generate the subset of recommendations for which the user corresponding to the identified interaction is qualified comprises filtering the accessed recommendation data through a series of qualification gates including all of the following: (1) a first qualification gate that filters recommendations for which the user does not meet eligibility criteria, (2) a second qualification gate that filters recommendations for which an agent handling the interaction with the user does not possess skills necessary to effectively present the recommendations, (3) a third qualification gate that filters recommendations that do not correspond to a target profile associated with the user, and (4) a fourth qualification gate that filters recommendations that have been previously offered to the user; and a memory separate from the electronic data store and including a cache, the system configured to cache user data associated with the user corresponding to the identified interaction and cache, from the electronic data store, the subset of recommendations, wherein the optimization and recommendation engine is further configured to:

determine initial interaction information related to the identified interaction with the user;

select, from among only the identified recommendations the subset of recommendations loaded into the cache, a first recommendation based on the user data loaded into the cache and the determined initial interaction information;

provide the first recommendation for presentation to the user;

monitor interactions relevant to the identified interaction with the user;

based on the monitoring, detect a change in interaction information related to the identified interaction with the user;

in response to detecting the change in interaction information, select, in real time and from among the subset of recommendations loaded into the cache, a second recommendation based on the user data loaded into the cache and the change in interaction information, the second recommendation being different than the first recommendation;

and provide the second recommendation for presentation to the user in real time.

2. A computer-implemented method of optimizing recommendations, the method comprising using one or more processors to perform operations comprising:

identifying an interaction with a user that presents an opportunity to provide a recommendation to the user;

loading, into a cache included in a memory that is separate from an electronic data store, user data associated with the user corresponding to the identified interaction;

accessing, from the electronic data store, recommendation data associated with available recommendations;

performing, using one or more processors, qualification analysis on the accessed recommendation data to identify recommendations for which the user corresponding to the identified interaction is qualified, wherein the performing generates a subset of recommendations from among the available recommendations based on the qualification analysis that identifies one or more recommendations for which the user is qualified, wherein performing the qualification analysis on the accessed recommendation data to generate the subset of recommendations for which the user corresponding to the identified interaction is qualified comprises filtering the accessed recommendation data through a series of qualification gates including all of the following: (1) a first qualification gate that filters recommendations for which the user does not meet eligibility criteria, (2) a second qualification gate that filters recommendations for which an agent handling the interaction with the user does not possess skills necessary to effectively present the recommendations, (3) a third qualification gate that filters recommendations that do not correspond to a target profile associated with the user, and (4) a fourth qualification gate that filters recommendations that have been previously offered to the user;

loading, into the cache and from the electronic data store, the subset of the recommendations;

determining initial interaction information related to the identified interaction with the user;

selecting, using the one or more processors and from among the subset of recommendations loaded into the cache, a first recommendation based on the user data loaded into the cache and the determined initial interaction information;

providing the first recommendation for presentation to the user;

monitoring interactions relevant to the identified interaction with the user;

based on the monitoring, detecting a change in interaction information related to the identified interaction with the user;

in response to detecting the change in interaction information, selecting, using the one or more processors, in real time and from among the subset of recommendations loaded into the cache, a second recommendation based on the user data loaded into the cache and the change in interaction information, the second recommendation being different than the first recommendation; and providing the second recommendation for presentation to the user in real time.

3. The computer-implemented method of claim 2 wherein loading, into a cache, user data associated with the user corresponding to the identified interaction comprises, in response to identifying the interaction with the user:

accessing, from the electronic data store, user data associated with the user corresponding to the identified interaction;

indexing the accessed user data; and loading, into the cache, the indexed user data.

4. The computer-implemented method of claim 2 wherein loading, into a cache, user data associated with the user corresponding to the identified interaction comprises loading, into the cache, user data associated with the user corresponding to the identified interaction prior to identifying the interaction with the user.

5. The computer-implemented method of claim 2 wherein performing qualification analysis on the accessed recommendation data to identify recommendations for which the user corresponding to the identified interaction is qualified comprises identifying, based on the user data loaded into the cache, recommendations for which the user meets eligibility criteria.

6. The computer-implemented method of claim 2 wherein performing qualification analysis on the accessed recommendation data to identify recommendations for which the user corresponding to the identified interaction is qualified comprises:

identifying an agent handling the interaction with the user;

accessing, from the electronic data store, skills information associated with the identified agent; and identifying, based on the accessed skills information, recommendations that correspond to the skills of the identified agent handling the interaction with the user.

7. The computer-implemented method of claim 2 wherein performing qualification analysis on the accessed recommendation data to identify recommendations for which the user corresponding to the identified interaction is qualified comprises:

determining, based on the user data loaded into the cache, a target profile corresponding to the user; and identifying recommendations that correspond to the target profile corresponding to the user.

8. The computer-implemented method of claim 2 wherein performing qualification analysis on the accessed recommendation data to identify recommendations for which the user corresponding to the identified interaction is qualified comprises:
identifying, based on the user data loaded into the cache, recommendations previously offered to the user; and
removing recommendations that have been previously offered to the user.

9. The computer-implemented method of claim 2 wherein selecting, from among only the identified recommendations loaded into the cache, a first recommendation based on the user data loaded into the cache and the determined initial interaction information comprises selecting the first recommendation based on a monetary value corresponding to the first recommendation.

10. The computer-implemented method of claim 2 wherein selecting, from among the subset of recommendations loaded into the cache, a first recommendation based on the user data loaded into the cache and the determined initial interaction information comprises:
determining, for each recommendation in the subset of recommendations loaded into the cache, a user suitability score based on the user data loaded into the cache and the determined initial interaction information;
determining, for each recommendation in the subset of recommendations loaded into the cache, a value score that reflects a relative monetary value of the corresponding recommendation;
determining, for each recommendation in the subset of recommendations loaded into the cache, a combined score based on the determined user suitability scores and the determined value scores, the combined scores reflecting a combination of expected response to the recommendations and business value of the recommendations; and
selecting the first recommendation based on the determined combined scores that reflect a combination of expected response to the recommendations and business value of the recommendations.

11. The computer-implemented method of claim 10 wherein selecting the first recommendation based on the determined combined scores comprises:
determining that at least two recommendations have the combined score that reflects the highest combination of expected response and business value of the identified recommendations loaded into the cache;
comparing the user suitability scores associated with the at least two recommendations; and
selecting, from among only the determined at least two recommendations, the recommendation having the user suitability score that reflects the highest expectation of response.

12. The computer-implemented method of claim 2 wherein:
providing the first recommendation for presentation to the user comprises sending, over a network, the first recommendation to an application system; and
monitoring interactions relevant to the identified interaction with the user comprises receiving, over the network and from the application system, feedback related to the user's reaction to the first recommendation.

13. The computer-implemented method of claim 2 wherein:

detecting a change in interaction information related to the identified interaction with the user comprises detecting that the user moves to a different section of a website while browsing the website; and
selecting, in real time and from among the subset of recommendations loaded into the cache, a second recommendation based on the user data loaded into the cache and the change in interaction information comprises selecting, in real time and from among the subset of recommendations loaded into the cache, a second recommendation that is related to the different section of the website.

14. The computer-implemented method of claim 2 wherein:
detecting a change in interaction information related to the identified interaction with the user comprises detecting that the user has made a complaint about price of a good or service during the interaction; and
selecting, in real time and from among the subset of recommendations loaded into the cache, a second recommendation based on the user data loaded into the cache and the change in interaction information comprises excluding recommendations loaded into the cache that are associated with a good or service that has a relatively high price.

15. The computer-implemented method of claim 2 wherein:
monitoring interactions relevant to the identified interaction with the user comprises monitoring aspects of service being provided in an environment in which the identified interaction with the user is occurring;
detecting a change in interaction information related to the identified interaction with the user comprises detecting a change in the service being provided in an environment in which the identified interaction with the user is occurring; and
selecting, in real time and from among the subset of recommendations loaded into the cache, a second recommendation based on the user data loaded into the cache and the change in interaction information comprises selecting, in real time, a second recommendation based on the detected change in the service being provided in an environment in which the identified interaction with the user is occurring.

16. The computer-implemented method of claim 2 wherein:
determining initial interaction information related to the identified interaction with the user comprises determining a communication channel associated with the interaction with the user and determining a reason that the user initiated the interaction; and
selecting, from among the subset of recommendations loaded into the cache, a first recommendation based on the user data loaded into the cache and the determined initial interaction information comprises selecting a first recommendation that is suitable for the communication channel associated with the interaction with the user and that accounts for the reason that the user initiated the interaction.

17. The computer-implemented method of claim 2 further comprising:
in response to determining the initial interaction information related to the identified interaction with the user, loading, into the cache, the initial interaction information;
in response to providing the first recommendation for presentation to the user, updating, in the cache, the interaction information to indicate that the first recommendation has been presented to the user;

in response to detecting the change in interaction information, updating, in the cache, the interaction information to reflect the detected change in interaction information; and in response to providing the second recommendation for presentation to the user in real time, updating, in the cache, the interaction information to indicate that the second recommendation has been presented to the user in real time.

18. The computer-implemented method of claim 2 further comprising:

identifying an agent handling the interaction with the user;

loading, into the cache, agent data associated with the agent handling the interaction with the user; and selecting, from among the subset of recommendations loaded into the cache, a first recommendation further comprises selecting, from among the subset of recommendations loaded into the cache, a first recommendation based on the agent data loaded into the cache.

19. At least one non-transitory computer-readable storage medium encoded with executable instructions that, when executed by a processor, cause the processor to perform operations comprising:

identifying an interaction with a user that presents an opportunity to provide a recommendation to the user;

loading, into a cache included in a memory that is separate from an electronic data store, user data associated with the user corresponding to the identified interaction;

accessing, from the electronic data store, recommendation data associated with available recommendations;

performing, using one or more processors, qualification analysis on the accessed recommendation data to identify recommendations for which the user corresponding to the identified interaction is qualified, wherein the performing generates a subset of recommendations from among the available recommendations based on the qualification analysis that identifies one or more recommendations for which the user is qualified, wherein performing the qualification analysis on the accessed recommendation data to generate the subset of recommendations for which the user corresponding to the identified interaction is qualified comprises filtering the accessed recommendation data through a series of qualification gates including all of the following: (1) a first qualification gate that filters recommendations for which the user does not meet eligibility criteria, (2) a second qualification gate that filters recommendations for which an agent handling the interaction with the user does not possess skills necessary to effectively present the recommendations, (3) a third qualification gate that filters recommendations that do not correspond to a target profile associated with the user, and (4) a fourth qualification gate that filters recommendations that have been previously offered to the user;

loading, into the cache and from the electronic data store, the subset of the recommendations;

determining initial interaction information related to the identified interaction with the user;

selecting, using the one or more processors and from among the subset of recommendations loaded into the cache, a first recommendation based on the user data loaded into the cache and the determined initial interaction information;

providing the first recommendation for presentation to the user;

monitoring interactions relevant to the identified interaction with the user;

based on the monitoring, detecting a change in interaction information related to the identified interaction with the user;

in response to detecting the change in interaction information, selecting, using the one or more processors, in real time and from among the subset of recommendations loaded into the cache, a second recommendation based on the user data loaded into the cache and the change in interaction information, the second recommendation being different than the first recommendation; and providing the second recommendation for presentation to the user in real time.

* * * * *